Patented June 26, 1934

1,963,974

UNITED STATES PATENT OFFICE 1,963,974

TREATMENT OF MATERIALS MADE OF OR CONTAINING CELLULOSE ESTERS OR ETHERS

George Holland Ellis, Spondon, near Derby, England, assignor to Celanese Corporation of America, a corporation of Delaware No Drawing. Application June 27, 1929, Serial No. 374,288. In Great Britain July 31, 1928

10 Claims. (Cl. 91—68)

This invention relates to the treatment of materials made of or containing cellulose acetate or other organic esters of cellulose, for example cellulose formate, propionate or butyrate, or the products obtained by treatment of alkalized cellulose with esterifying agents, (e. g. the product known as "immunized cotton" obtained by treatment with para-toluene sulpho-chloride), or made of or containing cellulose ethers, for example methyl, ethyl or benzyl cellulose or the condensation products of cellulose and glycols or other polyhydric alcohols. All of such cellulose derivatives are hereinafter included in the term organic substitution derivatives of cellulose.

According to the present invention I produce valuable materials by forming in materials comprising cellulose acetate or other organic substitution derivatives of cellulose insoluble metallic soaps. Such treatment renders the materials much more impervious to water and may also result according to the conditions in a partial or complete removal or subduing of the lustre.

It is of course well-known to waterproof ordinary textile materials by forming therein or thereon insoluble metallic soaps. The ordinary processes are however not applicable to cellulose acetate or other organic substitution derivatives of cellulose owing to the fact that these materials do not readily absorb the metallic radicles from solutions.

In the present invention this difficulty is surmounted by applying the metallic radicle under such conditions that swelling of the cellulose derivative occurs or by dissolving it in the spinning or other solution of the cellulose derivative used for the production of the materials.

A solution of the soluble metallic compound may either be applied at such concentrations or under such conditions as to cause a swelling of the cellulose derivative, or it may be applied in conjunction with or after a treatment of the materials with a swelling agent. Furthermore, if desirable, a treatment of the material with a swelling agent may precede the treatment with the metallic compound even though the latter swells the material or is used in conjunction with a swelling agent therefor. Suitable metals for use according to the present invention are heavy metals, for example tin, aluminium, iron or chromium. They may be applied in the form of their soluble salts, such as chlorides, sulphates or thiocyanates. The thiocyanate salts themselves have a swelling action upon the cellulose derivatives and do not require the presence or use of a separate swelling agent. The chlorides in comparatively concentrated solutions also swell cellulose derivatives, but swelling agents may be added to their solutions or may be applied to the materials before their use. Suitable swelling agents, particularly in aqueous solution, are acetic acid, formic acid, glycollic acid or lactic acid; ethyl alcohol, acetone, diacetone alcohol or diacetin; phenol, hydroquinone or other water soluble phenols or polyhydric phenols; thiocyanates or cyanates and urea, urethanes, thiourea, thio-urethanes, guanidine or alkyl or other simple derivatives thereof. Such swelling agents may be added to the solutions of the metallic compounds or they may be used for producing a swelling of the cellulose derivatives before treatment with the solutions of the metallic compounds.

The thiocyanates are moreover suitable for incorporation in the spinning or other solutions used for the manufacture of the materials. For example stannic thiocyanate may be dissolved in an acetone solution of cellulose acetate used for the production of filaments.

The insoluble soaps may be formed in the material by any suitable treatment, for example the materials treated with or containing a metallic compound as described above may afterwards, with or without rinsing, be treated with solutions of soluble soaps, so as to precipitate the insoluble soap in or on the material. The term "soaps" is employed broadly and embraces in addition to the salts of fatty acids, salts of sulphonated fatty acids or oils, resins, naphthenic acids and the like, and also the free acids themselves. As an alternative to applying the soap to the finished filaments or other materials, it may be dissolved in the spinning or other solution of the cellulose derivative used for the production of the materials.

Though as stated above the metallic radicles or the soaps may be applied in the solution used to form the materials, it is preferred to apply them to the finished products.

The concentrations, temperatures and other conditions of the treatment with the metallic compounds and/or with the soaps may be adjusted to obtain any desired amount of insoluble soap in or on the material. If desired, a further treatment of the material with a swelling agent may be carried out before or simultaneously with the treatment with a soap.

Coloured waterproof materials may be obtained by suitably colouring the materials. They may be dyed or otherwise coloured with any of the customary dyestuffs for cellulose ester or ether materials before or after the deposition of the insoluble soaps according to the present invention. Furthermore such dyestuffs may if desired be incorporated in the soap solutions themselves, if soluble therein, so as to colour and waterproof the material in one operation.

The following examples illustrate the invention but are not to be considered as limiting it in any way:—

Example 1

Cellulose acetate woven fabric is padded at 30° C. in a solution of tin chloro-thiocyanate prepared by dissolving 3 parts of stannic chloride and 1 part of ammonium thiocyanate in the least quantity of water and diluting to 42° Tw. The goods are now batched for 3 hours at 30° C. and then, without washing, treated for 15 minutes in a 5 grams per litre soap solution at 45° C. The fabric is now washed till free from thiocyanate and dried or otherwise treated as requisite.

Example 2

Cellulose acetate woven fabric is treated 20 minutes in the cold with a 20% solution of formic acid, lifted, and entered without rinsing into a solution of stannic chloride standing at 48° Tw. at 25° C. The goods are steeped for 1 hour in this solution, lifted, rinsed lightly, and entered into a separate bath containing 5 grams per litre of ammonium sulpho-ricinoleate, or of a salt of other sulphonated fatty acids at 45° C. After treating for 15 minutes the goods are lifted, washed off well, and dried or otherwise treated as requisite.

Example 3

Cellulose acetate woven fabric is dyed black by applying 2-3% tolidine, tetrazotizing and developing with α-naphthylamine, again tetrazotizing and developing with β-oxynaphthoic acid, all by known methods.

It is now padded in a solution containing 5 parts chromium chloride and 3 parts ammonium thiocyanate suitably diluted to stand at 36° Tw. at 30-35° C. After batching for 3 hours at this temperature the goods are treated for 15 minutes in a bath containing 5 grams of soap and 3 ccs. of ammonia per litre. The goods are now washed till free from thiocyanate, and dried or otherwise treated as requisite.

Though the invention has been described above more particularly with reference to materials consisting wholly of cellulose ester or ether, it may be applied to the waterproofing of materials comprising in addition to cellulose esters or ethers any other fibres, for example cotton or other natural cellulosic fibre, artificial cellulosic fibres (i. e. viscose, cuprammonium or nitro-cellulose artificial silks,) silk, wool, cotton, etc. Furthermore compounds of metals other than those mentioned above may be employed for the purpose of producing the insoluble metallic soaps, for example compounds of bismuth, zinc, antimony etc.

What I claim and desire to secure by Letters Patent is:—

1. Process for the treatment of materials comprising cellulose acetate, comprising forming therein insoluble tin soaps.

2. Process for the treatment of materials comprising cellulose acetate, comprising impregnating the materials with a tin compound and subsequently converting the same into an insoluble tin soap.

3. Process for the treatment of materials comprising cellulose acetate, comprising treating the materials with a tin salt solution under such conditions that swelling occurs and subsequently converting the tin radicle into an insoluble tin soap.

4. Process for the treatment of materials comprising cellulose acetate, comprising the steps of impregnating with a tin compound, forming an insoluble tin soap in the material and colouring the material.

5. Process for the treatment of materials comprising cellulose acetate, comprising impregnating with a tin compound and subsequently converting the same into an insoluble tin soap and at the same time colouring the material.

6. Materials comprising cellulose acetate and containing an insoluble tin soap.

7. Process for the treatment of materials containing organic derivatives of cellulose comprising forming therein an insoluble tin soap, the tin radicle of which is absorbed while the organic derivative of cellulose is in a swollen condition.

8. Process for the treatment of materials containing cellulose acetate comprising forming therein an insoluble tin soap, the tin radicle of which is absorbed while the cellulose acetate is in a swollen condition.

9. Process for the treatment of materials comprising organic derivatives of cellulose, comprising forming therein insoluble tin soaps.

10. Materials comprising organic derivatives of cellulose and containing an insoluble tin soap.

GEORGE HOLLAND ELLIS.